(12) United States Patent
Molina et al.

(10) Patent No.: US 8,000,321 B2
(45) Date of Patent: Aug. 16, 2011

(54) METHOD AND APPARATUS FOR IMPROVED NON-INTRUSIVE MONITORING FUNCTIONS

(75) Inventors: Angel Molina, Erlangen (DE); Stefan Baum, Erlangen (DE); Klaus Fritschi, Nuremberg (DE)

(73) Assignee: Alcatel Lucent, Paris (FR)

( * ) Notice: Subject to any disclaimer, the term of this patent is extended or adjusted under 35 U.S.C. 154(b) by 891 days.

(21) Appl. No.: 11/550,967

(22) Filed: Oct. 19, 2006

(65) Prior Publication Data
US 2008/0095064 A1   Apr. 24, 2008

(51) Int. Cl.
*H04L 12/50* (2006.01)
(52) U.S. Cl. ........................ 370/384; 709/230
(58) Field of Classification Search .................. 370/384; 709/230, 223; 398/19
See application file for complete search history.

(56) References Cited

U.S. PATENT DOCUMENTS

| | | | |
|---|---|---|---|
| 5,521,907 A | 5/1996 | Ennis, Jr. | |
| 5,751,339 A * | 5/1998 | Aramaki et al. | 348/14.13 |
| 2002/0034181 A1 | 3/2002 | Kalkunte et al. | |
| 2003/0074463 A1* | 4/2003 | Swartz et al. | 709/230 |
| 2005/0041684 A1* | 2/2005 | Reynolds et al. | 370/463 |
| 2005/0123294 A1* | 6/2005 | Mascolo et al. | 398/19 |
| 2007/0050538 A1* | 3/2007 | Northcutt et al. | 711/112 |

FOREIGN PATENT DOCUMENTS

| | | |
|---|---|---|
| EP | 1 689 124 A | 8/2006 |
| JP | 2004-328687 | 11/2004 |
| WO | WO 2005/109754 A | 11/2005 |

OTHER PUBLICATIONS

International Search Report & Written Opinion corresponding PCT/US2007/022031, Apr. 10, 2008, Lucent Technologies Inc.
Japanese Feb. 1, 2011 Office Action.

* cited by examiner

*Primary Examiner* — Dang T Ton
*Assistant Examiner* — Wei Zhao
(74) *Attorney, Agent, or Firm* — Wall & Tong, LLP

(57) ABSTRACT

The invention includes an apparatus and associated method for monitoring signals. The apparatus includes a port unit including a plurality of monitoring functions associated with a respective plurality of data communication channels, and a switch unit adapted for switching signals conveyed by the data communication channels, where the switch unit includes a monitoring function controller and a plurality of monitoring function images associated with the respective monitoring functions. The monitoring function images are adapted for conveying configuration information from the monitoring function controller to the respective monitoring functions and conveying status information from the respective monitoring functions to the monitoring function controller.

15 Claims, 7 Drawing Sheets

METHOD AND APPARATUS FOR IMPROVED NON-INTRUSIVE MONITORING FUNCTIONS

FIELD OF THE INVENTION

The invention relates to the field of communication networks and, more specifically, to non-intrusive monitoring functions of transport switches.

BACKGROUND OF THE INVENTION

The current direction in telecommunications standards development and telecommunications product development involves the convergence of circuit-based traffic and packet-based traffic in transport equipment. This convergence requires that transport equipment support a variety of connection-oriented (CO) transport technologies, including connection-oriented, circuit-switched (CO-CS) transport technologies (e.g., Synchronous Optical Network (SONET), Optical Transport Network (OTN), and like connection-oriented, circuit-switched transport technologies) and connection-oriented, packet-switched (CO-PS) transport technologies (e.g., Multiprotocol Label Switching (MPLS) and like connection-oriented, packet-switched transport technologies).

In transport equipment design, standards bodies (e.g., International Telecommunication Union-Telecommunications (ITU-T), Internet Engineering Task Force (IETF), and like standards bodies) are currently standardizing functionality models for such transport technologies. A key challenge in transport equipment design is translation of standard functionality models specified by standards bodies into specific technology implementations. An accurate implementation of the standardized functionality models in transport equipment implementations is a key design requirement since adherence to the standardized functionality models impacts the interoperability and network behavior of the resulting transport equipment implementation.

An important class of transport equipment includes transport switches (e.g., CO-CS transport switches, CO-PS transport switches, converged transport switches, and the like), which are characterized by signal switching functionality, protection switching functionality, and like functionality. The signals processed by transport switches typically include path-layer signals (i.e., an end-to-end traffic signal from a connectivity perspective) and section-layer signals (i.e., a bundle of path-layer signals transported between transport switches using a communication link). A transport switch may support many functions, including termination/origination of section-layer signals, protection switching of section-layer signals (section protection), and protection switching of path-layer signals (path protection).

In current transport switch implementations, an ingress section-layer signal is received by an ingress port unit. The ingress port unit terminates the ingress section-layer signal (e.g., by demultiplexing the ingress section-layer signal to extract path-layer signals conveyed by the ingress section-layer signal). The ingress port unit provides the extracted path-layer signals to a switch unit. The switch unit performs path-layer switching of path-layer signals. The switch unit provides the switched path-layer signals to an egress port unit. The egress port unit originates an egress section-layer signal (e.g., by multiplexing the switched path-layer signals to form the egress section-layer signal). The egress section-layer signal is transmitted by the egress port unit. In many current transport switch implementations, the port units and switch units are physically separate.

In current transport switch implementations, a transport switch may further include non-intrusive monitoring (NIM) of path-layer signals (P-NIM). The non-intrusive monitoring of path-layer signals may include monitoring path-layer signals for faults (i.e., path-layer fault management, which may also be referred to as path-FM) and monitoring path-layer signals for performance (i.e., path-layer performance management, which may also be referred to as path-PM). The non-intrusive monitoring of path-layer signals (e.g., path-FM and path-PM) is performed by NIM functions. In some existing transport switch implementations, NIM functions are implemented only on the switch units. In some existing transport switch implementations, NIM functions are implemented only on the port units.

In some existing transport switch implementations, in which section-layer protection is implemented using separate section-layer switching, NIM functions are located after (in the direction of transmission) the section-layer switch. In other existing transport switch implementations, however, for efficiency of implementation, section-layer protection may be implemented using path-layer switching functionality. In one such implementation, a pair of port units may be associated, where the first port unit is active and the second port unit is inactive (only becoming active if section-layer protection switching becomes necessary). In such implementations, since section-layer switching is implemented using path-layer switching, NIM functions are located before (in the direction of transmission) the section layer switch.

In such transport switch implementations, in order to emulate the fact that NIM functions are located after the section-layer switch in the standards model while NIM functions are located before the section-layer switch in the actual implementation, the transport switch uses a first set of NIM functions associated with the first port unit while the first port unit is active and a second set of NIM functions associated with the second port unit while the second port unit is active (i.e., after a section-layer protection switch). In such implementations, the set of NIM functions that is active at any given time depends on the status of the section-layer selector (i.e., which may either select the first port unit as the active port unit or the second port unit as the active port unit).

In some transport switch implementations, NIM functions (including NIM functions associated with the first port and NIM functions associated with the second port) may be implemented either on the switch unit or, alternatively, on the first port unit and second port unit, respectively. The NIM functions associated with the first port unit are active while the first port unit is active (and the NIM functions associated with the second port unit are inactive while the second port unit is inactive). If the section-layer switch flips from the first port unit to the second port unit, such that the first port unit becomes inactive and the second port unit becomes active, the NIM functions associated with the first port unit switch from being active to being inactive and the NIM functions associated with the second port unit switch from being inactive to being active.

In implementations in which NIM functions are implemented on the switch unit, since the cost of providing NIM functionality is concentrated on the switch unit (rather than being distributed), the startup cost of a transport switch system is high because the transport switch system must always provide the maximum number of possible NIM functions irrespective of actual system needs. In other words, implementations in which NIM functions are implemented on the switch unit prevent pay-as-you-grow strategies.

In implementations in which NIM functions are implemented on the port units, the set of active NIM functions is transferred between port units during section-layer protection switches (often referred to as "NIM hopping"). Since NIM hopping is a complex operation requiring nontrivial, time-critical handshakes across port units in order to emulate seamless operation specified in standards models, implementations in which NIM functions are implemented on the port units are complex and, therefore, expensive.

SUMMARY OF THE INVENTION

Various deficiencies in the prior art are addressed through the invention of an apparatus and associated method for monitoring signals. The apparatus includes a port unit including a plurality of monitoring functions associated with a respective plurality of data communication channels, and a switch unit adapted for switching signals conveyed by the data communication channels, where the switch unit includes a monitoring function controller and a plurality of monitoring function images associated with the respective monitoring functions. The monitoring function images are adapted for conveying configuration information from the monitoring function controller to the respective monitoring functions and conveying status information from the respective monitoring functions to the monitoring function controller.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides non-intrusive monitoring functions that are physically implemented on port units and logically controlled on a switch unit. The present invention provides non-intrusive monitoring function images on the switch unit. The non-intrusive monitoring function images, which are associated with respective non-intrusive monitoring functions on port units, emulate the non-intrusive monitoring functions without requiring the actual hardware/software resources of the respective non-intrusive monitoring functions to be disposed on the switch unit.

The present invention utilizes at least one communication channel between respective non-intrusive monitoring function images and non-intrusive monitoring functions. The at least one communication channel between the respective non-intrusive monitoring function images and non-intrusive monitoring functions is adapted to provide configuration information from the non-intrusive monitoring function images to the non-intrusive monitoring functions and provide status information from the non-intrusive monitoring functions to the non-intrusive monitoring function images.

By physically implementing non-intrusive monitoring functions on port units, while logically managing non-intrusive monitoring functions from a switch unit, the present invention distributes costs associated with providing non-intrusive monitoring functions, thereby reducing transport system start-up costs and enabling pay-as-you-grow transport systems (rather than requiring a maximum number of non-intrusive monitoring functions at system start-up). By centrally controlling distributed non-intrusive monitoring functions from a switch unit, the present invention enables centralized management of NIM-switching performed in response to protection switching, thereby obviating the need for complex cross-unit communication in support of NIM-switching capabilities.

Figure 1:
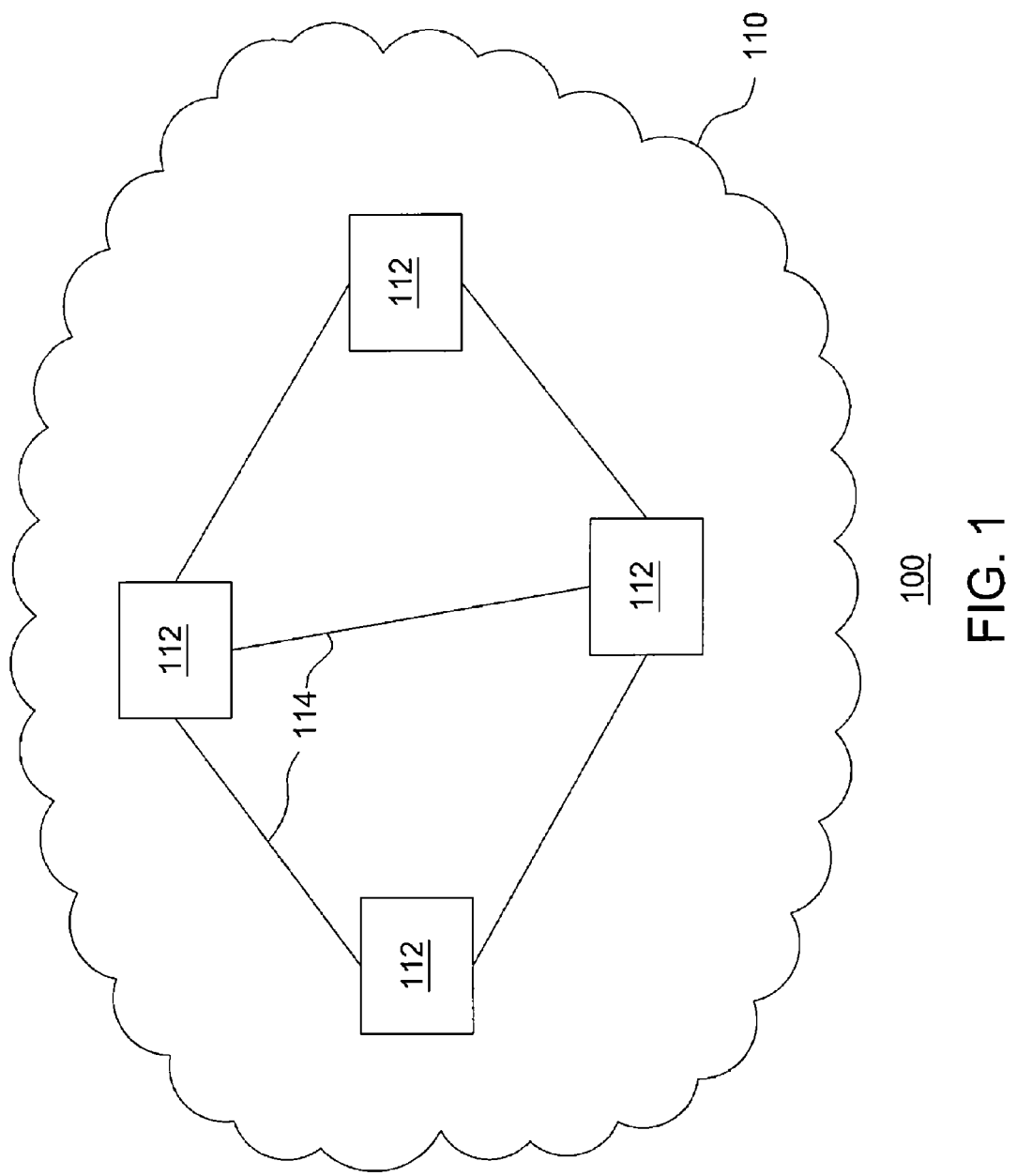
FIG. 1 depicts a high-level block diagram of a communication network.

FIG. 1 depicts a high-level block diagram of a communication network. Specifically, communication network 100 of FIG. 1 includes a transport network 110. The transport network 110 includes a plurality of transport switches 112 (collectively, transport switches 112). The transport switches 112 communicate using a plurality of communication paths 114 (collectively, communication paths 114). Although depicted as comprising a specific configuration of transport switches 112, transport network 110 may comprise various other configurations. Although omitted for purposes of clarity, communication network 100 may include various other network elements supporting communications between network endpoints.

The transport switches 112 support connection-oriented (CO) transport technologies. In one embodiment, transport switches 112 support connection-oriented, circuit-switched (CO-CS) transport technologies. For example, transport switches 112 may include Synchronous Optical Network (SONET) transport switches, Optical Transport Network (OTN) transport switches, and like transport switches supporting CO-CS transport technologies. In one embodiment, transport switches 112 support connection-oriented, packet-switched (CO-PS) transport technologies. For example, transport switches 112 may include Multiprotocol Label Switching (MPLS) transport switches and like transport switches supporting CO-PS transport technologies. In one embodiment, transport switches 112 may include switches supporting both CO-CS and CO-PS transport technologies (i.e., converged switches).

Figure 2:
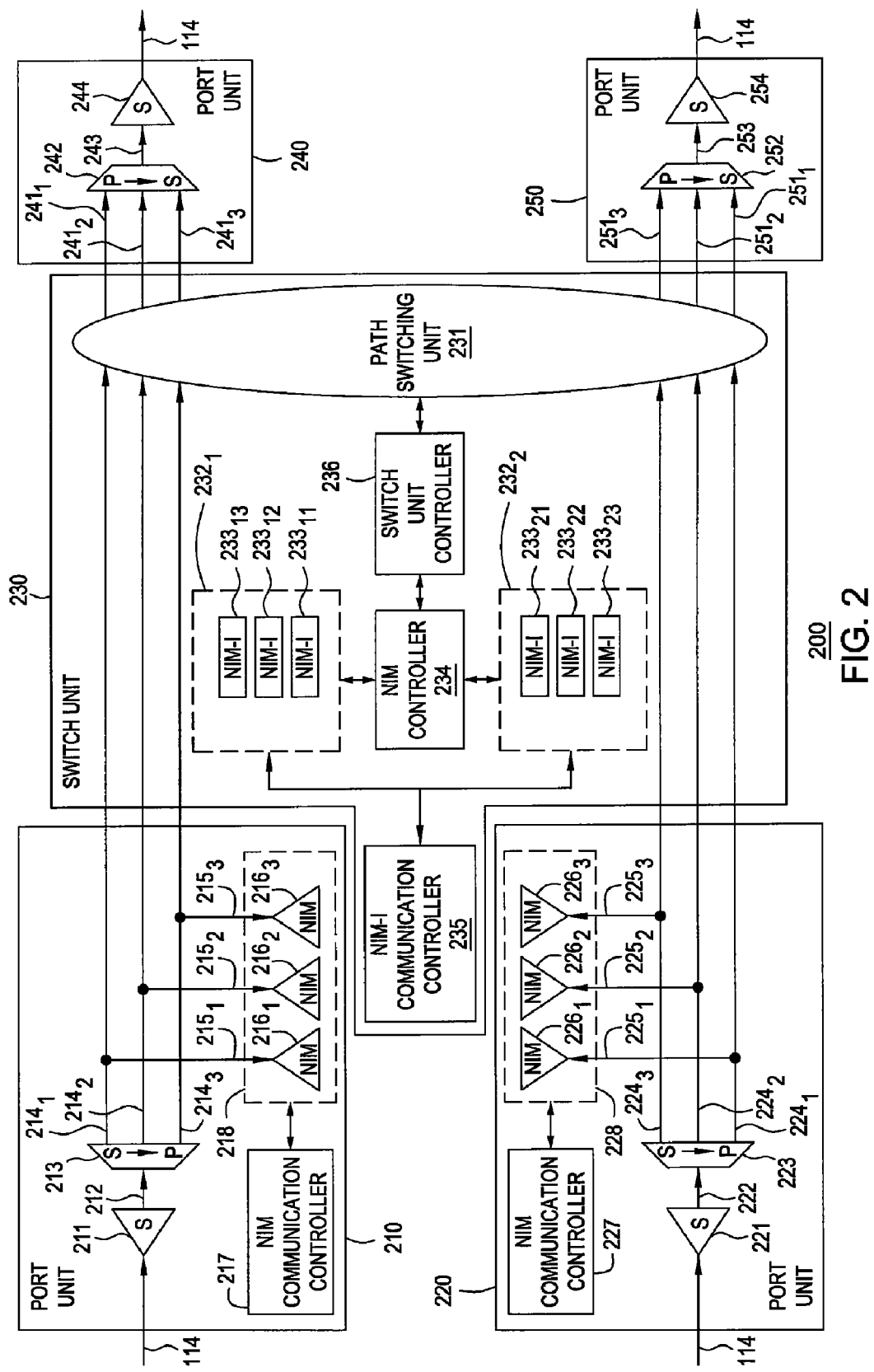
FIG. 2 depicts a high-level block diagram of one embodiment of a communication node of the communication network of FIG. 1.

FIG. 2 depicts a high-level block diagram of one embodiment of a communication node of the communication network of FIG. 1. Specifically, communication node 200 includes a plurality of port units 210, 220, 240, and 250 (which may be collectively referred to as port units) and a switch unit 230. The port units 210 and 220 include ingress port units. The port units 240 and 250 include egress port units. Although depicted and described logically as individual port units, in one embodiment, ingress port unit 210 and egress port unit 240 may be physically implemented as a single port unit. Similarly, although depicted and described logically as individual port units, in one embodiment, ingress port unit 220 and egress port unit 250 may be physically implemented as a single port unit. Although, for purposes of clarity, one direction of transmission is shown, two directions of transmission are typically present.

The ingress port unit 210 includes a section-layer receiver 211, a section-to-path-layer demultiplexer 213, and a non-intrusive monitor (NIM) module 218 including a plurality of non-intrusive monitors (NIMs) $216_1$-$216_3$ (collectively, NIMs 216). The section-layer receiver 211 receives a section-layer signal from a communication node (illustratively, from a transport switch 112 via one of the communication links 114). The section-layer receiver 211 provides the section-layer signal to section-to-path-layer demultiplexer 213 via a communication path 212. The section-to-path-layer demultiplexer 213 terminates the section-layer signal, thereby producing a plurality of path-layer signals conveyed by the section-layer signal. The section-to-path-layer demultiplexer 213 transmits the path-layer signals toward switch unit 230 using a respective plurality of communication paths $214_1$-$214_3$ (collectively, communication paths 214).

The NIMs $216_1$-$216_3$ non-intrusively monitor path-layer signals conveyed over communication paths $214_1$-$214_3$, respectively. The NIMs $216_1$-$216_3$ monitor path-layer signals conveyed over communication paths $214_1$-$214_3$, respectively, using a plurality of NIM tap lines $215_1$-$215_3$ (collectively, NIM tap lines 215), respectively. The NIMs $216_1$-$216_3$ monitor path-layer signals conveyed over communication paths $214_1$-$214_3$, respectively, using non-intrusive monitoring functions. The non-intrusive monitoring functions supported by NIMs 216 may include one or more of path-layer fault monitoring (FM) functions, path-layer performance monitoring (PM) functions, and the like, as well as various combinations thereof. In one embodiment, NIMs $216_1$-$216_3$ include configuration, monitoring, and status hardware elements for providing non-intrusive monitoring functions.

The ingress port unit 220 includes a section-layer receiver 221, a section-to-path-layer demultiplexer 223, and a non-intrusive monitor (NIM) module 228 including a plurality of non-intrusive monitors (NIMs) $226_1$-$226_3$ (collectively, NIMs 226). The section-layer receiver 221 receives a section-layer signal from a communication node (illustratively, from a transport switch 112 via one of the communication links 114). The section-layer receiver 221 provides the section-layer signal to section-to-path-layer demultiplexer 223 via a communication path 222. The section-to-path-layer demultiplexer 223 terminates the section-layer signal, thereby producing a plurality of path-layer signals conveyed by the section-layer signal. The section-to-path-layer demultiplexer 223 transmits the path-layer signals toward switch unit 230 using a respective plurality of communication paths $224_1$-$224_3$ (collectively, communication paths 224).

The NIMs $226_1$-$226_3$ non-intrusively monitor path-layer signals conveyed over communication paths $224_1$-$224_3$, respectively. The NIMs $226_1$-$226_3$ monitor path-layer signals conveyed over communication paths $224_1$-$224_3$, respectively, using a plurality of NIM tap lines $225_1$-$225_3$ (collectively, NIM tap lines 215), respectively. The NIMs $226_1$-$226_3$ monitor path-layer signals conveyed over communication paths $224_1$-$224_3$, respectively, using non-intrusive monitoring functions. The non-intrusive monitoring functions supported by NIMs 226 may include one or more of path-layer fault monitoring (FM), path-layer performance monitoring (PM), and the like, as well as various combinations thereof. In one embodiment, NIMs $226_1$-$226_3$ include configuration, monitoring, and status hardware elements for providing non-intrusive monitoring functions.

The egress port unit 240 includes a path-to-section-layer multiplexer 242 and a section-layer transmitter 244. The path-to-section-layer multiplexer 242 receives path-layer signals from switch unit 230 using a respective plurality of communication paths $241_1$-$241_3$ (collectively, communication paths 241). The path-to-section-layer multiplexer 242 multiplexes the path-layer signals, thereby forming another section-layer signal for conveying the path-layer signals. The path-to-section-layer multiplexer 242 provides the section-layer signal to section-layer transmitter 244 via a communication path 243. The section-layer transmitter 244 transmits the section-layer signal toward a communication node (illustratively, toward a transport switch 112 via one of the communication links 114).

The egress port unit 250 includes a path-to-section-layer multiplexer 252 and a section-layer transmitter 254. The path-to-section-layer multiplexer 252 receives path-layer signals from switch unit 230 using a respective plurality of communication paths $251_1$-$251_3$ (collectively, communication paths 251). The path-to-section-layer multiplexer 252 multiplexes the path-layer signals, thereby forming a section-layer signal for conveying the path-layer signals. The path-to-section-layer multiplexer 252 provides the section-layer signal to section-layer transmitter 254 via a communication path 253. The section-layer transmitter 254 transmits the section-layer signal toward a communication node (illustratively, toward a transport switch 112 via one of the communication links 114).

The switch unit 230 is disposed between ingress port units 210 and 220 and egress port units 240 and 250. The switch unit 230 includes a path switching unit 231. The path switching unit 231 switches path-layer signals. In one embodiment, path switching unit 231 switches path-layer signals in response to control signals received from a switch unit controller 236. In one embodiment, path switching unit 231 switches path-layer signals individually. In one embodiment, path switching unit 231 switches groups of path layer signals. In one such embodiment, path switching unit 231 may switch path-layer signals associated with a section-layer signal as a group (e.g., switching path-layer signals conveyed by communication paths $214_1$-$214_3$ to communication paths $251_1$-$251_3$, respectively).

In one embodiment, ingress port units 210 and 220 and egress port units 240 and 250, respectively, operate as working port units. In one embodiment, communication node 200 may support protection switching functions. In one embodiment, switch unit 230 (illustratively, switch unit controller 236) controls protection switching by which port units switch from "working" to "inactive" and from "protection" to "working". In one such embodiment, one of ingress port units 210 and 220 operates as a working port unit while the other of ingress port units 210 and 220 operates as a protection port unit and, similarly, one of egress port units 240 and 250 operates as a working port unit while the other of egress port units 240 and 250 operates as a protection port unit.

In one embodiment, in which ingress port units 210 and 220 and egress port units 240 and 250 operate as working port units, path switching unit 231 may switch path-layer signals from any of communication paths 214 and 224 of port units 210 and 220, respectively, to any of communication paths 241 and 251 of port units 240 and 250, respectively. In one embodiment, in which one of ingress port units 210 and 220 operates as a working port unit while the other of ingress port units 210 and 220 operates as a protection port unit and one of egress port units 240 and 250 operates as a working port unit while the other of egress port units 240 and 250 operates as a protection port unit, path switching unit 231 may switch path-layer signals from any of communication paths 214 or 224 to any of communication paths 241 or 251 (depending on which of the ingress and egress port units are currently the working port units).

The switch unit 230 includes a NIM-image module $232_1$ and a NIM-image module $232_2$ (collectively, NIM-image modules 232). The NIM-image modules $232_1$ and $232_2$ communicate with a NIM controller 234. The NIM-image module $232_1$ includes a plurality of NIM-images $233_{11}$-$233_{13}$ (collectively, NIM-images $233_1$) associated with NIMs $216_1$-$216_3$, respectively. The NIM-image module $232_2$ includes a plurality of NIM-images $233_{21}$-$233_{23}$ (collectively, NIM-images $233_2$) associated with NIMs $226_1$-$226_3$, respectively. The NIM-images $233_1$ and $233_2$ may be collectively referred to as NIM-images 233. Although depicted and described as being implemented using two NIM-image modules, NIM-images 232 may be implemented using fewer or more NIM-image modules.

As described herein, in accordance with the present invention, NIMs are physically located on port units (illustratively, NIMs 216 on port unit 210 and NIMs 226 on port unit 220) and logically managed from a switch unit (illustratively, NIM controller 234 of switch unit 230 using NIM-images $233_{11}$-$233_{13}$ associated with NIMs 216 and NIM-images $233_{21}$-$233_{23}$ associated with NIMs 226). The NIM-images $233_{11}$-$233_{13}$ and $233_{21}$-$233_{23}$ comprise hardware representations of NIMs $216_1$-$216_3$ and $226_1$-$226_3$, respectively. The NIM-images $233_{11}$-$233_{13}$ and $233_{21}$-$233_{23}$ emulate NIMs $216_1$-$216_3$ and $226_1$-$226_3$, respectively. In one embodiment, in which NIMs $216_1$-$216_3$ and $226_1$-$226_3$ include configuration, monitoring, and status hardware elements, NIM-images $233_{11}$-$233_{13}$ and $233_{21}$-$233_{23}$ emulate the configuration and status hardware elements of NIMs $216_1$-$216_3$ and $226_1$-$226_3$, respectively.

The NIM-images $233_{11}$-$233_{13}$ and $233_{21}$-$233_{23}$ on switch unit 230 operate as proxies for NIMs $216_1$-$216_3$ and $226_1$-$226_3$, respectively, such that NIM controller 234 on switch unit 230 may manage NIMs $216_1$-$216_3$ and $226_1$-$226_3$ physically located on ingress port units 210 and 220 as if NIMs $216_1$-$216_3$ and $226_1$-$226_3$ were physically located on switch unit 230. In other words, NIM-related software (illustratively, NIM controller 234) on switch unit 230 may be completely unaware that it is dealing with a representation (i.e., image) of a NIM function which is physically implemented on a port unit.

The switch unit 230 includes a NIM-image communication controller 235. The NIM-image communication controller 235 communicates with NIM-images $233_1$ and $233_2$ of NIM-image modules $232_1$ and $232_2$, respectively. The NIM-image communication controller 235 controls communications by NIM-images $233_1$ and $233_2$ with NIMs 216 and 226, respectively. In one embodiment, as described herein, NIM-image communication controller 235 controls communication of NIM configuration information from NIM-images $233_1$ and $233_2$ to NIMs 216 and 226, respectively. The NIM-image communication controller 235 may control one of one or more forms of in-band communications, one or more forms of out-of-band communications, and the like, as well as various combinations thereof.

The NIM controller 234 provides NIM configuration information to NIM-images $233_1$ and $233_2$. The NIM configuration information may be generated by NIM controller 234 using information local to NIM controller 234, generated by NIM controller 234 using information received by other components (e.g., other components of switch unit 230, other components of communication node 200, and the like, as well as various combinations thereof), received from one or more other components (e.g., other components of switch unit 230, other components of communication node 200, and the like, as well as various combinations thereof), and the like, as well as various combinations thereof.

The NIM-images $233_1$ and $233_2$ provide NIM configuration information to NIMs 216 and 226, respectively. The NIM configuration information is provided to NIMs 216 and 226 transparently (i.e., NIM controller 234 is unaware that NIM configuration information is being provided to NIMs 216 and 226 indirectly using NIM-images $233_1$ and $233_2$, respectively). The NIM configuration information includes information adapted for configuring NIMs 216 and 226 to perform non-intrusive monitoring functions. The NIMs 216 and 226 are configured according to the NIM configuration information received from NIM controller 234 indirectly via NIM-images $233_1$ and $233_2$, respectively.

In one embodiment, NIMs $216_1$-$216_3$ and $226_1$-$226_3$, and associated NIM-images $233_{11}$-$233_{13}$ and $233_{21}$-$233_{23}$, respectively, include configuration hardware elements. In one such embodiment, NIM configuration information received by NIM-images $233_{11}$-$233_{13}$ and $233_{21}$-$233_{23}$ from NIM controller 234 is used to adapt the configuration hardware elements of NIM-images $233_{11}$-$233_{13}$ and $233_{21}$-$233_{23}$ to be able to configure NIMs $216_1$-$216_3$ and $226_1$-$226_3$, respectively. In this embodiment, NIM configuration information is provided from the configuration hardware elements of NIM-images $233_{11}$-$233_{13}$ and $233_{21}$-$233_{23}$ to the configuration hardware elements of NIMs $216_1$-$216_3$ and $226_1$-$226_3$, respectively, in order to configure NIMs $216_1$-$216_3$ and $226_1$-$226_3$.

The port units 210 and 220 include NIM communication controllers 217 and 227, respectively. The NIM communication controllers 217 and 227 communicate with NIMs 216 and 226 of NIM modules 218 and 228, respectively. The NIM communication controllers 217 and 227 control communications by NIMs 216 and 226 with NIM-images $233_1$ and $233_2$, respectively. In one embodiment, as described herein, NIM communication controllers 217 and 227 control communication of NIM status information from NIMs 216 and 226 to NIM-images $233_1$ and $233_2$, respectively. The NIM communication controllers 217 and 227 may control one or more forms of in-band communication and one or more forms of out-of-band communication, as well as various combinations thereof.

The NIMs 216 and 226 provide NIM status information to NIM-images $233_1$ and $233_2$, respectively. The NIM status information includes any path monitoring information collected by NIMs 216 and 226 (e.g., NIM fault monitoring information, NIM performance monitoring information, and the like, as well as various combinations thereof). The NIM-images $233_1$ and $233_2$ provide NIM status information received from NIMs 216 and 226, respectively, to NIM controller 234. The NIM status information is provided to NIM controller 234 transparently (i.e., NIM controller 234 is unaware that NIM status information is being received from NIMs 216 and 226 indirectly using NIM-images $233_1$ and $233_2$, respectively).

In one embodiment, NIMs $216_1$-$216_3$ and $226_1$-$226_3$, and associated NIM-images $233_{11}$-$233_{13}$ and $233_{21}$-$233_{23}$, respectively, include status hardware elements. In one such embodiment, NIM status information is collected by NIMs $216_1$-$216_3$ and $226_1$-$226_3$ using the status hardware elements to be able to provide the NIM status information to NIM controller 234. In this information, NIM status information is provided from status hardware elements of NIMs $216_1$-$216_3$ and $226_1$-$226_3$ to status hardware elements of NIM-images $233_{11}$-$233_{13}$ and $233_{21}$-$233_{23}$, respectively. The NIM status information associated with NIMs $216_1$-$216_3$ and $226_1$-$226_3$ is available to NIM controller 234 from the status hardware elements of NIM-images $233_{11}$-$233_{13}$ and $233_{21}$-$233_{23}$, respectively.

The NIM configuration information and NIM status information is exchanged between NIMs 216 and 226 and respective NIM-images $233_1$-$233_2$ using at least one communication channel between NIMs 216 and 226 and NIM-images $233_1$-$233_2$, respectively. The exchange of NIM configuration and status information may be performed using at least one of: one or more in-band communication channels, one or more out-of-band communication channels, and the like, as well as various combinations thereof. The exchange of NIM configuration information and NIM status information between NIMs 216 and 226 and associated NIM-images $233_1$ and $233_2$, respectively, may be better understood with respect to FIG. 3-FIG. 5, which depict exemplary communication channels adapted for exchanging NIM configuration and status information.

Figure 3:
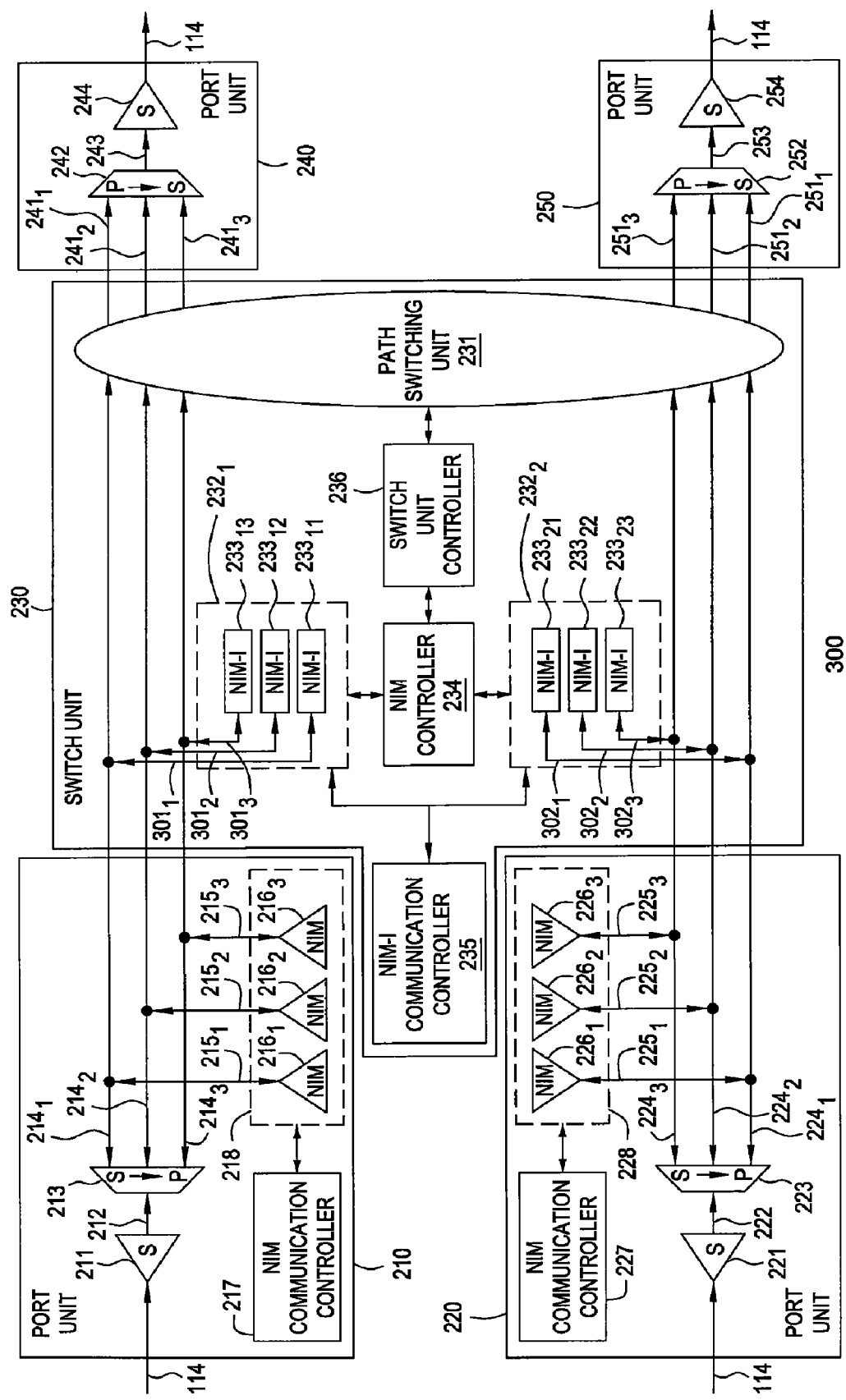
FIG. 3 depicts a high-level block diagram of the communication node of FIG. 2 in which the communication node supports in-band communication between NIMs and associated NIM images.

FIG. 3 depicts a high-level block diagram of the communication node of FIG. 2 in which the communication node supports in-band communication between NIMs and associated NIM-images for exchanging NIM configuration and status information. As depicted in FIG. 3, communication node 300 is substantially similar to communication node 200 depicted and described with respect to FIG. 2. As depicted in FIG. 3, communication node 300 utilizes a combination of existing and new communication paths in support of in-band communication channels adapted for providing NIM configuration information from the NIM controller to associated NIMs via respective NIM-images and providing NIM status information from NIMs to the NIM controller via respective NIM-images.

As depicted in FIG. 3, switch unit 230 includes a first plurality of NIM-image tap lines $301_1$-$301_3$ which form respective bidirectional connection paths between NIM-images $233_{11}$-$233_{13}$ and communication paths $214_1$-$214_3$, respectively, thereby enabling NIM-images $233_1$ to transmit NIM configuration information to associated NIMs 216 and receive NIM status information from associated NIMs 216. As depicted in FIG. 3, switch unit 230 includes a second plurality of NIM-image tap lines $302_1$-$302_3$ which form respective bidirectional connection paths between NIM-images $233_{21}$-$233_{23}$ and communication paths $224_1$-$224_3$, respectively, thereby enabling NIM-images $233_2$ to transmit NIM configuration information to associated NIMs 226 and receive NIM status information from associated NIMs 226.

As depicted in FIG. 3, NIM tap lines $215_1$-$215_3$ by which NIMs $216_1$-$216_3$ monitor path-layer signals conveyed over communication paths $214_1$-$214_3$, respectively, form bidirectional communication paths, thereby enabling NIMs 216 to receive NIM configuration information from associated NIM-images $233_1$, as well as transmit NIM status information to associated NIM-images $233_1$, using associated communication paths 214. As depicted in FIG. 3, NIM tap lines $225_1$-$225_3$ by which NIMs $226_1$-$226_3$ access path-layer signals conveyed over communication paths $224_1$-$224_3$, respectively, comprise bidirectional communication paths, thereby enabling NIMs 226 to receive NIM configuration information from associated NIM-images $233_2$, and transmit NIM status information to associated NIM-images $233_2$, using associated communication paths 224.

As depicted in FIG. 3, communication paths 214 between port unit 210 and switch unit 230 convey NIM configuration information from NIM-image tap lines $301_1$-$301_3$ to NIM tap lines $215_1$-$215_3$, respectively, and convey NIM status information from NIM tap lines $215_1$-$215_3$ to NIM-image tap lines $301_1$-$301_3$, respectively. As depicted in FIG. 3, communication paths 224 between port unit 220 and switch unit 230 convey NIM configuration information from NIM-image tap lines $302_1$-$302_3$ to NIM tap lines $225_1$-$225_3$, respectively, and convey NIM status information from NIM tap lines $225_1$-$225_3$ to NIM-image tap lines $302_1$-$302_3$, respectively.

The NIM-image communication controller 235 controls transmission of NIM status information from NIM-images $233_1$ and $233_2$ using NIM-image tap lines 301 and 302, communication paths 214 and 224, and NIM tap lines 215 and 225, respectively. The NIM communication controller 217 controls transmission of NIM status information from NIMs 216 using NIM tap lines $215_1$-$215_3$, communication paths $214_1$-$214_3$, and NIM-image tap lines $301_1$-$301_3$, respectively. The NIM communication controller 227 controls transmission of NIM status information from NIMs 226 using NIM tap lines $225_1$-$225_3$, communication paths $224_1$-$224_3$, and NIM-image tap lines $302_1$-$302_3$, respectively.

The NIM configuration and status information may be conveyed using one or more transmission schemes. In one embodiment, NIM configuration and status information is exchanged by embedding the NIM configuration and status information within path-layer signals conveyed between the port units and the switch unit. In one such embodiment, at least a portion of the NIM configuration and status information may be conveyed using a portion of the overhead of path-layer signals conveyed between the port units and the switch unit. In one embodiment, NIM configuration and status information is exchanged using additional signals (i.e., signals in addition to the path-layer signals) conveyed between the port units and the switch unit. Although described with respect to specific transmission schemes, NIM configuration and status information may be exchanged using various other transmission schemes.

Figure 4:
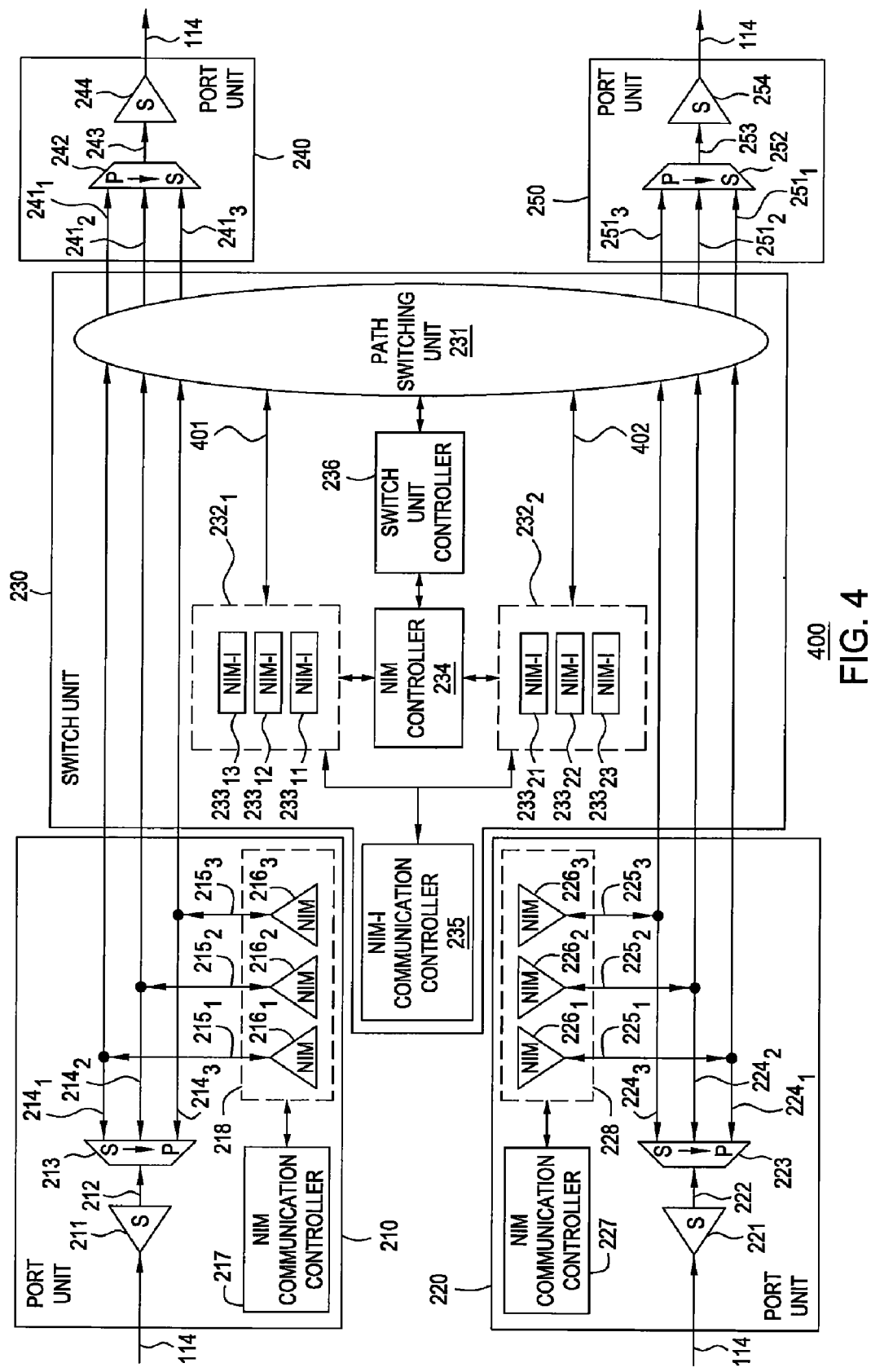
FIG. 4 depicts a high-level block diagram of the communication node of FIG. 2 in which the communication node supports in-band communication between NIMs and associated NIM images.

FIG. 4 depicts a high-level block diagram of the communication node of FIG. 2 in which the communication node supports in-band communication between NIMs and NIM-images for exchanging NIM configuration and status information (using a different architecture than depicted and described herein with respect to FIG. 3). As depicted in FIG. 4, communication node 400 is substantially similar to communication node 200 depicted and described with respect to FIG. 2. As depicted in FIG. 4, communication node 400 utilizes a combination of existing and new communication paths in support of in-band communication channels adapted for providing NIM configuration information from the NIM controller to associated NIMs via respective NIM-images and providing NIM status information from NIMs to the NIM controller via respective NIM-images.

As depicted in FIG. 4, communication paths 214 between port unit 210 and switch unit 230 and communication paths 224 between port unit 220 and switch unit 230 convey NIM configuration and status information between respective NIMs 216 and 226 and path switching unit 231. In communication node 300, switch unit 230 includes an additional communication path 401 between path switching unit 231 and NIM-image module $232_1$ and an additional communication path 402 between path switching unit 231 and NIM-image module $232_2$. The additional communication paths 401 and 402 are used for conveying NIM configuration and status information between path switching unit 231 and NIM-images $233_1$ and $233_2$, respectively.

As depicted in FIG. 4, NIM tap lines $215_1$-$215_3$ by which NIMs $216_1$-$216_3$ monitor path-layer signals conveyed over communication paths $214_1$-$214_3$, respectively, form bidirectional communication paths, thereby enabling NIMs 216 to receive NIM configuration information from associated NIM-images $233_1$, as well as transmit NIM status information to associated NIM-images $233_1$, using associated communication paths 214. The path switching unit 231 switches NIM configuration information provided by NIM-images $233_1$ from additional communication path 401 to communication paths 214. The path switching unit 231 switches NIM status information provided by NIMs 216 from communication paths 214 to additional communication path 401.

As depicted in FIG. 4, NIM tap lines $225_1$-$225_3$ by which NIMs $226_1$-$226_3$ access path-layer signals conveyed over communication paths $224_1$-$224_3$, respectively, comprise bidirectional communication paths, thereby enabling NIMs 226 to receive NIM configuration information from associated NIM-images $233_2$, and transmit NIM status information to associated NIM-images $233_2$, using associated communication paths 224. The path switching unit 231 switches NIM configuration information provided by NIM-images $233_2$ from additional communication path 402 to communication paths 224. The path switching unit 231 switches NIM status information provided by NIMs 226 from communication paths 224 to additional communication path 402.

The NIM-image communication controller 235 controls transmission of NIM status information from NIM-images $233_1$ and $233_2$ using additional communication paths 401 and 402, communication paths 214 and 224, and NIM tap lines 215 and 225, respectively. The NIM communication controller 217 controls transmission of NIM status information from NIMs 216 using NIM tap lines $215_1$-$215_3$, communication paths $214_1$-$214_3$, and additional communication path 401, respectively. The NIM communication controller 227 controls transmission of NIM status information from NIMs 226 using NIM tap lines $225_1$-$225_3$, communication paths $224_1$-$224_3$, and additional communication path 402, respectively.

The NIM configuration and status information may be conveyed using one or more transmission schemes. In one embodiment, NIM configuration and status information is exchanged by embedding the NIM configuration and status information within path-layer signals conveyed between the port units and the switch unit. In one such embodiment, at least a portion of the NIM configuration and status information may be conveyed using a portion of the overhead of path-layer signals conveyed between the port units and the switch unit. In one embodiment, NIM configuration and status information is exchanged using additional signals (i.e., signals in addition to the path-layer signals) conveyed between the port units and the switch unit. Although described with respect to specific transmission schemes, NIM configuration and status information may be exchanged using various other transmission schemes.

Figure 5:
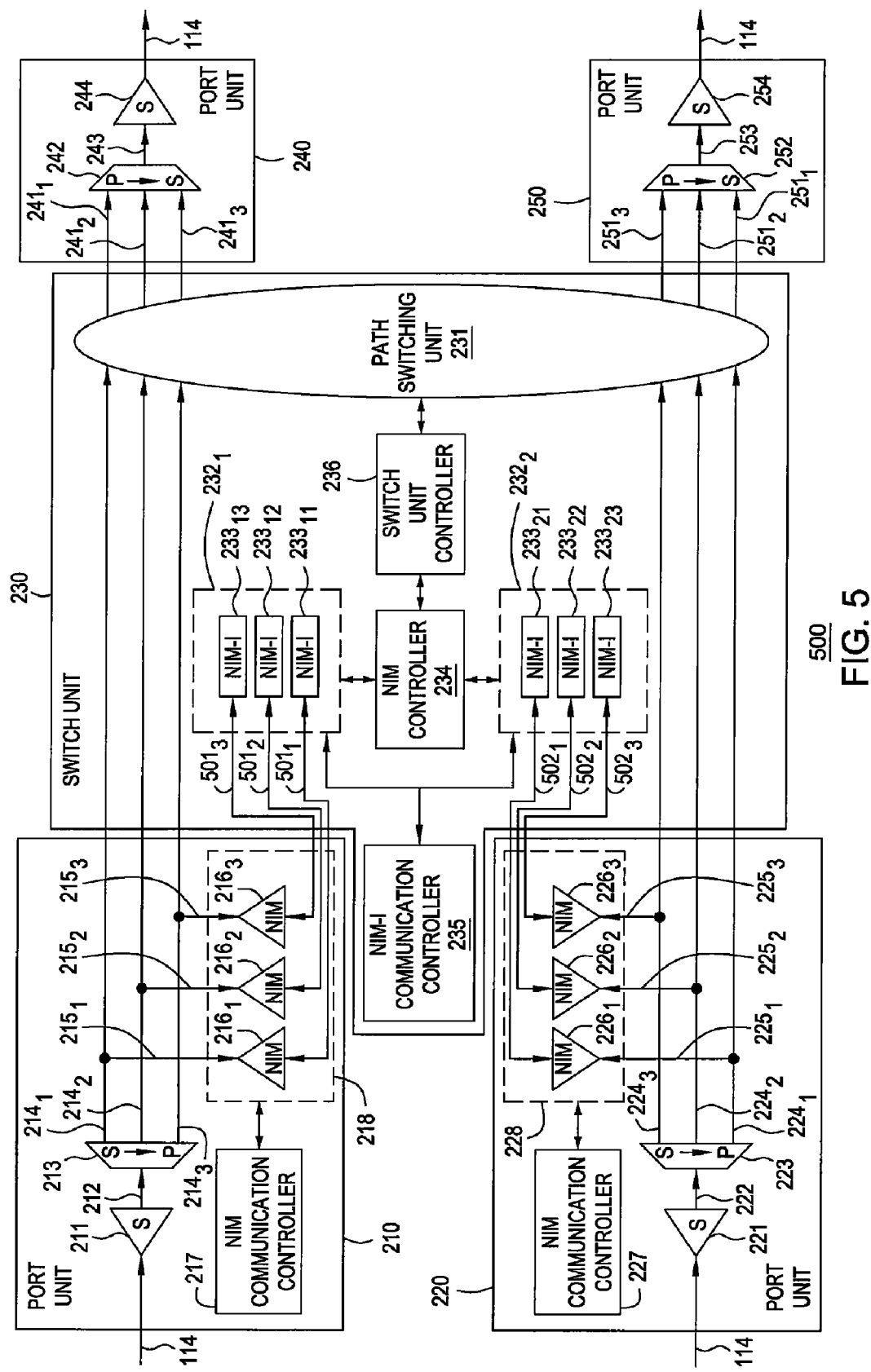
FIG. 5 depicts a high-level block diagram of the communication node of FIG. 2 in which the communication node supports out-of-band communication between NIMs and associated NIM images.

FIG. 5 depicts a high-level block diagram of the communication node of FIG. 2 in which the communication node supports out-of-band communication between NIMs and associated NIM-images for exchanging NIM configuration and status information. As depicted in FIG. 5, communication node 500 is substantially similar to communication node 200 depicted and described with respect to FIG. 2. As depicted in FIG. 5, communication node 500 utilizes out-of-band communication channels adapted for providing NIM configuration information from the NIM controller to associated NIMs via respective NIM-images and providing NIM status information from NIMs to the NIM controller via respective NIM-images.

As depicted in FIG. 5, communication node 500 includes a plurality of communication channels $501_1$-$501_3$ (collectively, communication channels 501) between NIMs $216_1$-$216_3$ and NIM-images $233_{11}$-$233_{13}$, respectively, and a plurality of communication channels $502_1$-$502_3$ (collectively, communication channels 502) between NIMs $226_1$-$226_3$ and NIM-images $233_{21}$-$233_{23}$, respectively. Although depicted as individual communication channels $501_1$-$501_3$ and $502_1$-$502_3$, in one embodiment, one or more communication channels may be implemented between NIM modules 218 and 228 and NIM-image modules $232_1$ and $232_2$, respectively (e.g., using a single communication channel between NIM modules 218 and 228 and NIM-image modules $232_1$ and $232_2$, respectively).

As depicted in FIG. 5, communication channels 501 and 502 support bidirectional communication. The communication channels 501 and 502 support bidirectional communications between NIM-images $233_1$ and $233_2$ and associated NIMs 216 and 226, respectively, for exchanging NIM configuration and status information. The NIM-image communication controller 235 controls transmission of NIM status information from NIM-images $233_1$ and $233_2$ using communication channels 501 and 502, respectively. The NIM communication controller 217 controls transmission of NIM status information from NIMs 216 using communication channels 501. The NIM communication controller 227 controls transmission of NIM status information from NIMs 226 using communication channel 502.

In one embodiment, communication channels 501 and 502 may be implemented as hardware-controlled communication channels between NIM-images $233_1$ and $233_2$ and associated NIMs 216 and 226, respectively. In one embodiment, communication channels 501 and 502 may be implemented as software-controlled communication channels between NIMs 216 and 226 and associated NIM-images $233_1$ and $233_2$, respectively. In such embodiments, out-of-band communication channels 501 and 502 adapted for exchanging NIM configuration and status information between NIMs and associated NIM-images may be implemented using various transmission schemes, including existing or new signaling/messaging protocols, formats, and the like, as well as various combinations thereof.

Figure 6:
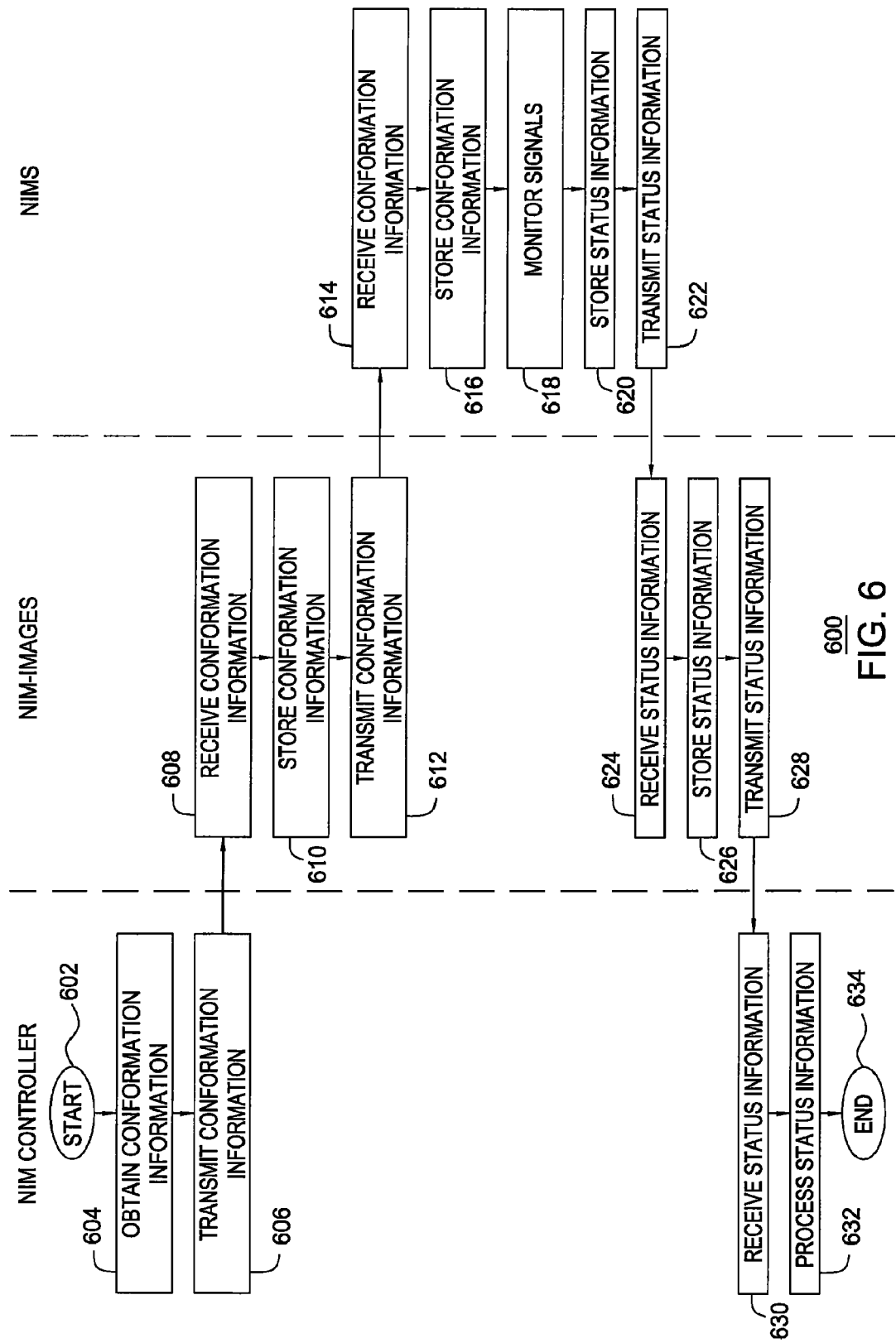
FIG. 6 depicts a method according to one embodiment of the present invention.

FIG. 6 depicts a method according to one embodiment of the present invention. Specifically, method 600 includes a method for monitoring, from a switch unit, signals on associated port units. More specifically, method 600 includes a method for exchanging NIM configuration and status information between NIMs and associated NIM images. Although primarily depicted and described herein as being performed serially, at least a portion of the steps of method 600 may be performed contemporaneously, or in a different order than presented in FIG. 6. The method 600 begins at step 602 and proceeds to step 604.

At step 604, a NIM controller (illustratively, NIM controller 234) obtains NIM configuration information. In one embodiment, the NIM controller obtains NIM configuration information by generating at least a portion of the NIM configuration information. The NIM controller may generate NIM configuration information using information local to the NIM controller, information received by the NIM controller from one or more other components internal and/or external to the communication node, and the like, as well as various combinations thereof. In one embodiment, the NIM controller obtains NIM configuration information by receiving and/or retrieving at least a portion of the NIM configuration information from one or more other components internal and/or external to the communication node.

At step 606, the NIM controller transmits the configuration information to NIM-images (illustratively, to NIM-images $233_1$ and $233_2$). At step 608, the NIM-images receive the configuration information from the NIM controller. At step 610, the NIM-images store the configuration information. In one embodiment, the NIMs store the configuration information in one or more configuration registers. At step 612, the NIM-images transmit the configuration information to associated NIMs (illustratively, NIMs 216 and 226 associated with NIM-images $233_1$ and $233_2$, respectively). As described herein, the configuration information may be transmitted from the NIM-images to the NIMs using one or more in-band or out-of-band communication channels.

At step 614, the NIMs receive the configuration information. At step 616, the NIMs store the configuration information, which may include any information adapted for configuring the NIMs to perform signal monitoring functions, such as signal fault monitoring, signal performance monitoring, and the like, as well as various combinations thereof. In one embodiment, the NIMs store the configuration information in one or more configuration registers. The NIMs receiving the configuration information are configured according to the configuration information.

At step 618, the NIMs monitor signals (e.g., performing one or more of fault monitoring, performance monitoring, and the like, as well as various combinations thereof). In one embodiment, the NIMs monitor signals using one or more monitoring and/or status registers. At step 620, the NIMs store NIM status information, which may include any information associated with signals monitored by the NIMs. At step 622, the NIMs transmit the status information to associated NIM-images. As described herein, the status information may be transmitted from the NIMs to the NIM-images using one or more in-band or out-of-band communication channels.

At step 624, the NIM-images receive the status information. At step 626, the NIM-images store the status information. In one embodiment, the NIM-images store the status information in one or more status registers. At step 628, the NIM-images transmit the status information to the NIM controller. Although omitted for purposes of clarity, in one embodiment, the NIM controller may retrieve status information from the NIM-images. At step 630, the NIM controller receives the status information. At step 632, the NIM controller processes the status information. At step 634, method 600 ends.

The NIM controller may perform various functions using the status information. The NIM controller may process the status information in order to determine whether or not to modify associated configuration information (e.g., to modify configuration information associated with the NIM from which the status information is received). The NIM controller may process the status information in order to modify associated configuration information. The NIM controller may process the status information in order to determine whether or not to perform various additional functions (e.g., determining whether to trigger alerts and/or alarms, determining whether to initiate a protection switching action, and the like, as well as various combinations thereof). The NIM controller may process the status information in order to perform one or more of such additional functions.

In one embodiment, the NIM controller may store at least a portion of the status information (e.g., locally within the communication node, in one or more remote network elements, and the like, as well as various combinations thereof) for maintaining status history. In one embodiment, the NIM controller may provide at least a portion of the status information to one or more other modules (illustratively, switch unit 230 and, although not depicted, other network elements adapted for processing such status information). In such embodiments, the stored and/or provided status information may be used for performing additional processing (e.g., for identifying trends in the status information, and the like), and the like, as well as various combinations thereof.

Figure 7:
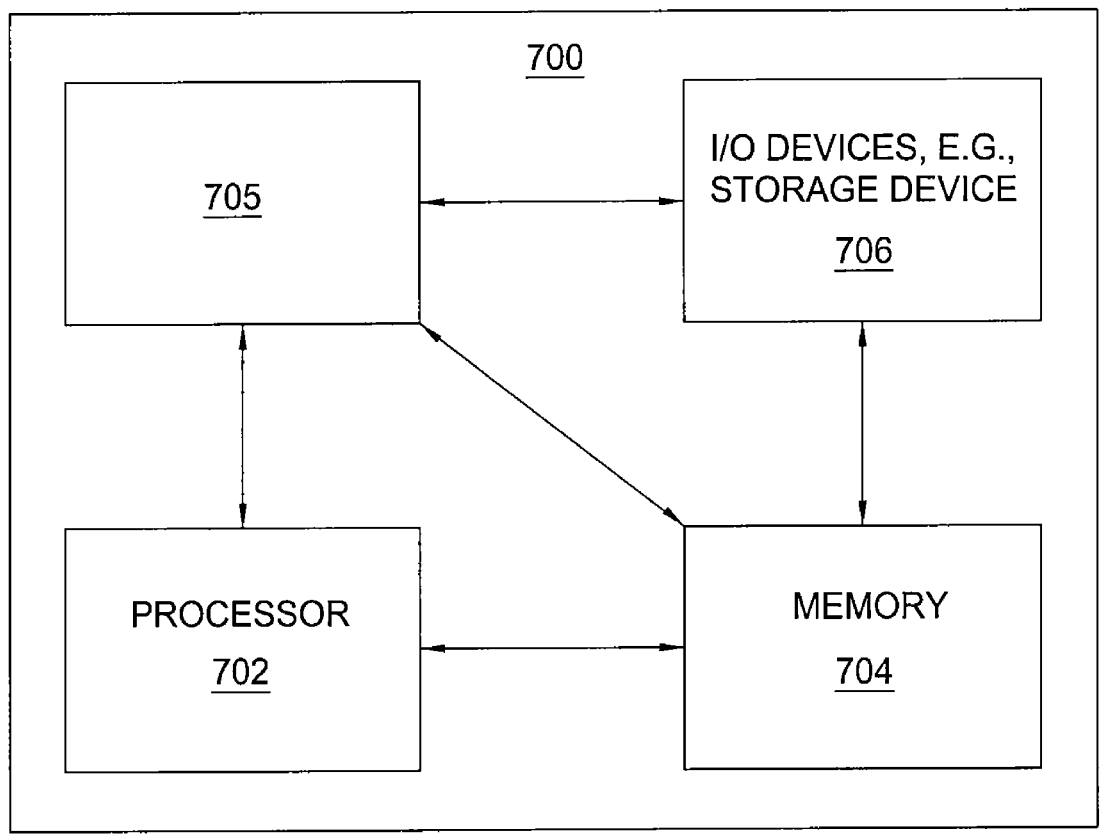
FIG. 7 depicts a high-level block diagram of a general-purpose computer suitable for use in performing at least a portion of the functions described herein.

FIG. 7 depicts a high-level block diagram of a general-purpose computer suitable for use in performing the functions described herein. As depicted in FIG. 7, system 700 includes a processor element 702 (e.g., a CPU), a memory 704, e.g., random access memory (RAM) and/or read only memory (ROM), a non-intrusive monitoring module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

The present invention may be implemented in software and/or in a combination of software and hardware, e.g., using application specific integrated circuits (ASIC), a general purpose computer or any other hardware equivalents. In one embodiment, the present non-intrusive monitoring module or process 705 can be loaded into memory 704 and executed by processor 702 to implement the functions as discussed above. As such, non-intrusive monitoring process 705 (including associated data structures) of the present invention can be stored on a computer readable medium or carrier, e.g., RAM memory, magnetic or optical drive or diskette and the like.

Although primarily depicted and described herein with respect to NIMs and associated NIM-images being implemented using hardware (e.g., NIM and NIM-image configuration and status registers), NIMs and associated NIM-images in accordance with the present invention may be implemented using hardware, software, and the like, as well as various combinations thereof. Although primarily depicted and described herein with respect to specific implementations of communication channels adapted for exchanging NIM configuration and status information, various other implementations of communication channels may be utilized for exchanging NIM configuration and status information in accordance with the present invention.

Although primarily depicted and described with respect to a generic transport switch, the present invention may be applied in connection-oriented, circuit-switched (CO-CS) transport switches (e.g., SONET switches, OTN switches, and the like, as well as various combinations thereof), connection-oriented, packet-switched (CO-PS) transport switches (e.g., MPLS switches and the like, as well as various combinations thereof), converged transport switches, and the like, as well as various combinations thereof. As described herein, although one direction of transmission is depicted and described herein, two directions of transmission are typically present.

Although various embodiments which incorporate the teachings of the present invention have been shown and described in detail herein, those skilled in the art can readily devise many other varied embodiments that still incorporate these teachings.

What is claimed is:

1. An apparatus for monitoring signals associated with a plurality of data communication channels, comprising:
   a port unit comprising a plurality of monitoring functions associated with the respective plurality of data communication channels; and
   a switch unit for switching signals conveyed by the data communication channels, the switch unit comprising a controller and a plurality of monitoring function images associated with the respective monitoring functions;
   wherein the monitoring function images are configured for conveying configuration information from the controller to the respective monitoring functions and conveying status information from the respective monitoring functions to the controller;

a second port unit comprising a plurality of second monitoring functions associated with a plurality of second data communication channels;

wherein the switch unit comprises a plurality of second monitoring function images associated with respective second monitoring functions;

wherein, in response to a section-layer switch from the port unit to the second port unit, the monitoring functions of the port unit become inactive and the second monitoring functions of the second port unit become active.

2. The apparatus of claim 1, wherein the monitoring functions comprise non-intrusive monitoring functions.

3. The apparatus of claim 1, wherein each monitoring function comprises a plurality of configuration hardware elements and a plurality of status hardware elements, wherein each monitoring function image comprises configuration and status hardware elements substantially similar to the configuration and status hardware elements of the monitoring function associated with that monitoring function image.

4. The apparatus of claim 1, further comprising:

at least one communication channel between the monitoring functions and the monitoring function images, the at least one communication channel for conveying the configuration information from the monitoring function images to the respective monitoring functions and conveying the status information from the monitoring functions to the respective monitoring function images.

5. The apparatus of claim 4, wherein each of the at least one communication channel comprises one of an in-band communication channel and an out-of-band communication channel.

6. A method for monitoring signals conveyed between a port unit and a switch unit over a plurality of data communication channels, the switch unit having a controller associated therewith, the method comprising:

providing configuration information from the controller to a plurality of monitoring function images on the switch unit, the monitoring function images configured for providing the configuration information to a respective plurality of monitoring functions on the port unit; and propagating the configuration information from the monitoring function images on the switch unit toward the respective monitoring functions on the port unit;

wherein each monitoring function comprises a plurality of configuration hardware elements and a plurality of status hardware elements, wherein each monitoring function image comprises configuration and status hardware elements substantially similar to the configuration and status hardware elements of the monitoring function associated with that monitoring function image.

7. The method of claim 6, wherein the configuration information is propagated from the monitoring function images on the switch unit toward the respective monitoring functions on the port unit using at least one of an in-band communication and an out-of-band communication channel.

8. A method for monitoring signals conveyed between a port unit and a switch unit over a plurality of data communication channels, the switch unit having a controller associated therewith, the method comprising:

receiving, at a plurality of monitoring function images on the switch unit, status information from a respective plurality of monitoring functions on the port unit; and propagating the status information from the monitoring function images on the switch unit toward the controller on the switch unit;

wherein each monitoring function comprises a plurality of configuration hardware elements and a plurality of status hardware elements, wherein each monitoring function image comprises configuration and status hardware elements substantially similar to the configuration and status hardware elements of the monitoring function associated with that monitoring function image.

9. The method of claim 8, wherein the status information is received at the monitoring function images on the switch unit from the monitoring functions on the port unit using at least one of an in-band communication channel and an out-of-band communication channel.

10. An apparatus for monitoring signals associated with a plurality of data communication channels, comprising:

a port unit comprising a plurality of monitoring functions associated with the respective plurality of data communication channels;

a switch unit for switching signals conveyed by the data communication channels, the switch unit comprising a plurality of monitoring function images associated with the respective monitoring functions; and at least one communication channel between the monitoring functions and the monitoring function images, the at least one communication channel for conveying configuration information from the monitoring function images to the respective monitoring functions and conveying status information from the monitoring functions to the respective monitoring function images;

a second port unit comprising a plurality of second monitoring functions associated with a plurality of second data communication channels;

wherein the switch unit comprises a plurality of second monitoring function images associated with respective second monitoring functions;

wherein, in response to a section-layer switch from the port unit to the second port unit, the monitoring functions of the port unit become inactive and the second monitoring functions of the second port unit become active.

11. The apparatus of claim 10, wherein the monitoring functions comprise non-intrusive monitoring functions.

12. The apparatus of claim 10, wherein each monitoring function comprises a plurality of configuration hardware elements and a plurality of status hardware elements, wherein each monitoring function image comprises configuration and status hardware elements substantially similar to the configuration and status hardware elements of the monitoring function associated with that monitoring function image.

13. The apparatus of claim 10, wherein the switch unit further comprises a controller, wherein the controller is configured for generating the configuration information.

14. The apparatus of claim 13, wherein the controller is configured for providing the configuration information to the monitoring function images and receiving the status information from the monitoring function images.

15. The apparatus of claim 10, wherein each of the at least one communication channel comprises one of an in-band communication channel and an out-of-band communication channel.

* * * * *